March 10, 1936.  B. W. KEESE  2,033,246
DRIVING ARRANGEMENT AND CONSTRUCTION FOR TANDEM AXLES
Filed July 15, 1930
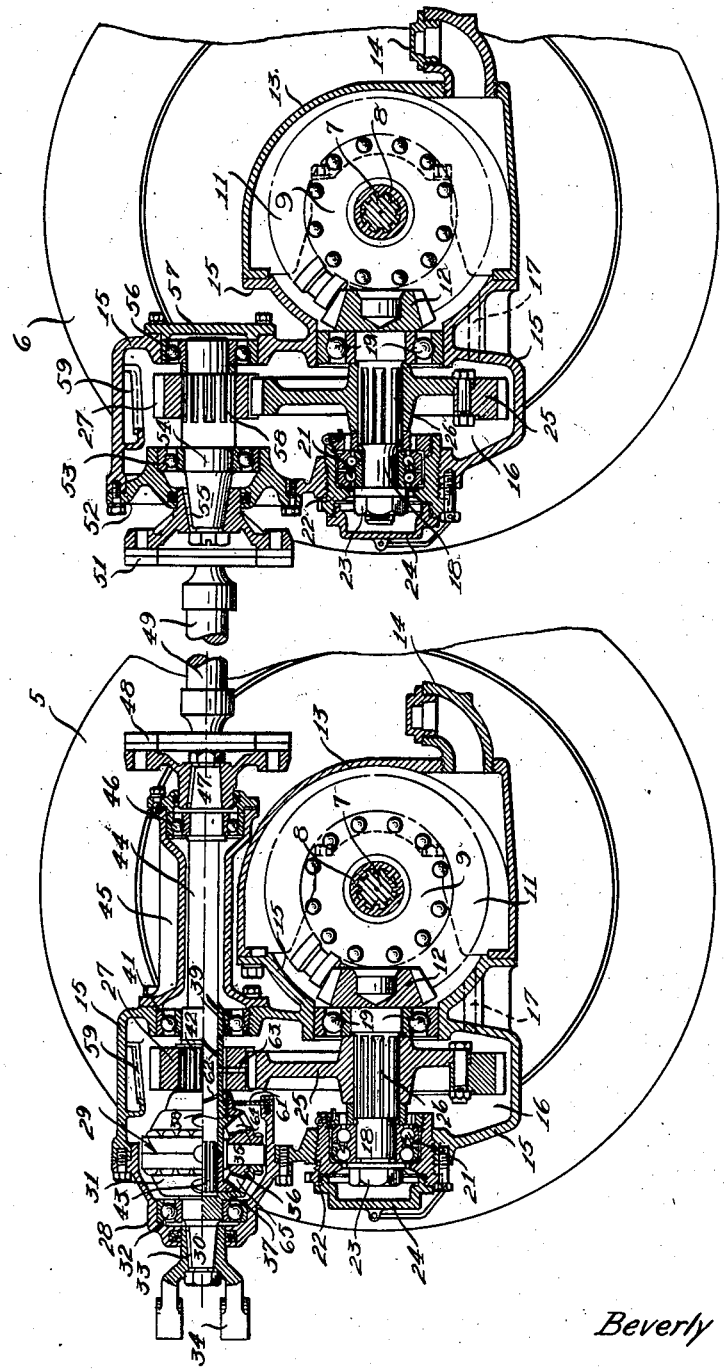
Inventor
Beverly W. Keese
By
Strauch & Hoffman
Attorneys Patented Mar. 10, 1936

2,033,246

UNITED STATES PATENT OFFICE 2,033,246

DRIVING ARRANGEMENT AND CONSTRUCTION FOR TANDEM AXLES

Beverly W. Keese, Oshkosh, Wis., assignor to Timken-Detroit Axle Company, Detroit, Mich., a corporation Application July 15, 1930, Serial No. 468,192

1 Claim. (Cl. 184—11)

This invention relates to driving arrangements and constructions for the tandem axles of multi-wheel vehicles. The invention is particularly concerned with double reduction drives and with dual drive axles to which power is transmitted through a third differential, but many of the features and principles of the invention may be advantageously utilized in connection with axles and driving arrangements of different character than those disclosed.

In dual axle drive practice it is often found desirable and sometimes necessary, to drive one set of the tandem wheels differentially with respect to the other set, in addition to differentially driving the wheels common to the particular axle that they support. This is especially true when the axles are relatively widely spaced or when the suspension system is of great flexibility.

It is a major object of my invention to devise new and improved apparatus for causing self-lubrication in each axle assembly, whereby all of the parts of the assembly will be thoroughly lubricated at all times during operation.

Another object of my invention is to devise new and improved apparatus for lubricating the third differential.

It is a still further object of my invention to provide means for causing a lubricant to be thrown from the speed reducing mechanism of one of the axle assemblies to a pocket from which the lubricant will be conveyed under the action of gravity to the third differential between the sets of drive wheels.

Other and further objects will become apparent from a study of the following detailed description when taken in connection with the accompanying drawing in which:

The figure represents a vertical longitudinal sectional view taken centrally of a tandem axle driving assembly comprising a pair of differentially driven, double reduction axles.

With further reference to the drawing wherein like numerals are employed to designate like parts, numerals 5 and 6 indicate the tandem wheels at one side of a dual axle driving assembly. These wheels may be the front and rear wheels respectively of a driving unit arranged at the rear end of a road vehicle wherein the power plant (not shown) is mounted at the forward end of the vehicle. Each wheel is driven by an axle shaft 7 that is splined at its inner end for a driving fit within a gear hub 8 forming part of a differential mechanism. This mechanism is not completely shown but it comprises the usual driven casing 9 within which the differentiating gears and pinions are housed.

The differential casings 9 are driven by bevel gears, comprising ring gears 11 rigidly secured to the casings and pinions 12 in mesh with said ring gears. Each casing is housed and supported within a conventional wheel-supported axle housing 13. Each housing 13 has a rearward connection 14 for lubricant supply and at its forward side it is open adjacent the pinion 12 and designed to receive and support a specially shaped casing 15. The casings 15 are designed to support and to lubricate driving mechanism about to be described.

Each casing 15 is shaped to provide a lubricant space 16 at its bottom portion, into which the lubricant may flow from housing 13 by way of a horizontal interconnecting passage 17. Just above this space the casing 15 has a longitudinally and horizontally arranged opening therethrough for the reception of a countershaft 18 one end of which carries a pinion 12 and is journaled in the casing by a ball bearing assembly 19. The other end of the shaft 18 is supported by a bearing assembly 21 caged in an adjustable sleeve 22 that is screwed into the opening in the casing. A nut 23 on this end of the shaft may be manipulated (turned) simultaneously with the sleeve to take up any slack or longitudinal play in the shaft and bearing assembly. A cap 24 closes the outer end of the sleeve.

The shaft 18 and pinion 12 are driven by a large reduction gear 25 that is splined, as at 26, upon the central portion of the shaft. Each gear 25 in turn is driven by a smaller gear 27 mounted thereabove. Up to this point it will be observed that both axle assemblies are identical in construction. The housings 13, 15, the differentials, and the driving elements 12, 18, 25, and 27 of each axle being duplicates of the corresponding elements of the other axle, great savings in production costs, and in the expenses for replacements and repairs, are thereby effected. Due to the rise of a third differential, however, the mechanisms for driving the small reduction gears 27 necessarily are different and will be described separately.

At the upper end of the forward side of the casing 15 for the front axle a bearing cap 28 is secured. This cap cooperates with casing 15 to house a third differential 29. The latter includes a differential casing 31 that has an integral spindle extension 30, journaled in the cap by a bearing assembly 32 and projecting forwardly to be keyed, as at 33, to a connector 34 for coupling it with the main propeller shaft (not shown). The differential casing is thus positively rotated by the propeller shaft. The differential casing rigidly carries, in conventional manner, a set of radial pins 35 each of which is freely journaled in a differentiating pinion 36. These pinions have teeth 64 in meshing engagement with the teeth 65 of a differentiating gear 37 journaled in the left side of the casing and with a second gear 38 journaled in the right side of the casing. The second gear, 38, has an integral tubular extension 39 that projects rearwardly for rotatable support in a bearing assembly 41 carried by the casing 15. The extension 39 is in splined engagement, as at 42, with the forward reduction gear 27. The other differentiating gear, 37, is in splined driving engagement, as at 43, with the forward end of a propeller shaft section 44 that is journaled in the tubular extension 39 and extended rearwardly to drive the rear axle mechanism, as follows:

A short sleeve-like casing 45 is mounted just over the front housing 13 and rigidly secured to the front casing 15. Casing 45 carries at its rear end a bearing assembly 46 for the shaft 44. The latter, where it emerges from the bearing 46, has a conical end 47 keyed to a conventional flexible coupling 48, this coupling in turn being in driving engagement with a propeller shaft section 49 that projects rearwardly to drive the rear axle mechanism by way of a second flexible coupling 51. The latter is journaled in a cap 52 secured to the rear casing and which provides a cage for a bearing assembly 53. A short shaft 54 is journaled in the bearing 53 and keyed, as at 55, within the coupling 51. The rear end of shaft 54 is mounted in a bearing 56 that is carried by the casing 15 and maintained in position by a closure plate 57. The shaft 54 receives the rear reduction gear 27 and drives it through a set of splines 58.

From the foregoing description it will be seen that the driving torque, received by the differential casing 29 from the power source, is differentially transmitted to the small gears 27 and thereafter multiplied by the gears 25 and 11 and then transmitted to the axle shafts 7 by way of the usual differential mechanism within the housings 13. All moving parts are efficiently lubricated during operation. The lubricant is fed through connections 14 into the housings 13 to a predetermined level. The ring gears 11 rotate through the lubricant and convey it upwardly, after which it finds its way to the axle differentials, the pinions 12, bearings 19, splines 26 and bearings 21. It flows through passages 17 into the reservoirs 16 of casings 15 and is thence conveyed upwardly by the gears 25 to the gears 27. Each casing 15 has formed therewith a channel or pocket 59 into which the gears 27 are adapted to throw the lubricant. The latter then flows, in the rear axle assembly, toward the left and falls to lubricate the bearings 53 and 21. In the front axle assembly the oil flows from the pocket 59 onto the third differential 29 to lubricate its mechanism and the bearing 32. Some of this oil is retained in the space around said differential by a thin plate 61 that is secured to a lower portion of the housing cap 28. The contacting surfaces of shaft 44 and tubular sleeve 39 are kept thoroughly lubricated by spiral grooves 62 on said shaft and a radial passage 63 running through the gear 27 and said sleeve. The bearings 41 and 46 are lubricated by oil that flows from the gear 27 into the casing 45 along the sleeve 39.

What I claim and desire to secure by United States Letters Patent is:—

In combination in a multi-wheel drive comprising sets of drive wheels arranged in tandem, individual driving mechanism for each set of wheels, a housing for one of said driving mechanisms, a casing secured to said housing enclosing said driving mechanism and adapted to receive lubricant into which said mechanism dips, torque transmitting means journalled in said casing substantially above the lubricant level in said casing, a driving connection between said torque transmitting means and each of said individual driving mechanisms comprising a differential to divide the torque between said driving mechanisms, a shaft connecting said differential and one of said driving mechanisms, a hollow sleeve journalled on said shaft and having a pinion thereon for connecting said differential to the other of said individual driving mechanisms, said pinion and said sleeve having aligned cooperating radial ducts for transmitting lubricant from the last mentioned individual driving mechanism to the contacting surface between said shaft and said sleeve and opposed spiral grooves in the outer periphery of said surface of said shaft for distributing said lubricant.

BEVERLY W. KEESE.